United States Patent
Ullman et al.

(10) Patent No.: US 7,694,297 B2
(45) Date of Patent: Apr. 6, 2010

(54) SYSTEM AND METHOD FOR APPLET CACHING

(75) Inventors: Cayce M. Ullman, Redwood City, CA (US); Brian L. Matthews, Kent, WA (US)

(73) Assignee: Cisco Technology, Inc., San Jose, CA (US)

( * ) Notice: Subject to any disclaimer, the term of this patent is extended or adjusted under 35 U.S.C. 154(b) by 732 days.

(21) Appl. No.: 10/330,680

(22) Filed: Dec. 27, 2002

(65) Prior Publication Data

US 2003/0146933 A1 Aug. 7, 2003

Related U.S. Application Data

(60) Provisional application No. 60/346,373, filed on Dec. 28, 2001.

(51) Int. Cl.
*G06F 9/445* (2006.01)
*G06F 15/16* (2006.01)

(52) U.S. Cl. .................. 717/178; 717/176; 717/177; 709/203; 709/229

(58) Field of Classification Search ........... 715/748; 717/116, 168, 174
See application file for complete search history.

(56) References Cited

U.S. PATENT DOCUMENTS

| | | | | |
|---|---|---|---|---|
| 5,944,781 A * | 8/1999 | Murray | ............ | 709/202 |
| 6,188,400 B1 * | 2/2001 | House et al. | ............ | 715/805 |
| 6,209,029 B1 * | 3/2001 | Epstein et al. | ............ | 709/219 |
| 6,324,685 B1 * | 11/2001 | Balassanian | ............ | 717/118 |
| 6,327,609 B1 * | 12/2001 | Ludewig et al. | ............ | 709/203 |
| 6,385,652 B1 * | 5/2002 | Brown et al. | ............ | 709/227 |
| 6,446,111 B1 * | 9/2002 | Lowery | ............ | 709/203 |
| 6,553,405 B1 * | 4/2003 | Desrochers | ............ | 709/203 |
| 6,571,389 B1 * | 5/2003 | Spyker et al. | ............ | 717/176 |
| 6,584,495 B1 * | 6/2003 | Bisset et al. | ............ | 709/217 |
| 6,717,509 B1 * | 4/2004 | Murphy | ............ | 340/10.1 |
| 6,910,066 B1 * | 6/2005 | Pohl | ............ | 709/203 |
| 7,174,333 B2 * | 2/2007 | Yamada et al. | ............ | 707/9 |
| 7,249,168 B1 * | 7/2007 | Ryder | ............ | 709/220 |
| 7,281,047 B2 * | 10/2007 | Hayko et al. | ............ | 709/229 |
| 2002/0095522 A1 * | 7/2002 | Hayko et al. | ............ | 709/311 |
| 2002/0122055 A1 * | 9/2002 | Parupudi et al. | ............ | 345/737 |
| 2002/0124049 A1 * | 9/2002 | Gorodetsky et al. | ............ | 709/203 |
| 2003/0061602 A1 * | 3/2003 | Graham et al. | ............ | 717/148 |
| 2003/0120542 A1 * | 6/2003 | Arning | ............ | 705/14 |

FOREIGN PATENT DOCUMENTS

DE 197 12 127 A 10/1998

OTHER PUBLICATIONS

JAVA.SUN.COM, Applet Caching in Java Plug-In (Aug. 2000).
ISR, PCT/US02/41501 Mailed Oct. 22, 2003.

* cited by examiner

*Primary Examiner*—Tuan Q Dam
*Assistant Examiner*—Isaac T Tecklu
(74) *Attorney, Agent, or Firm*—Hickman Palermo Truong & Becker LLP

(57) ABSTRACT

The invention involves a method for an Applet to be stored on a hard drive attached or available to a computer, such that the Applet is available to other programs running on the same computer wishing to make us of the Applet without transferring the Applet over the Internet.

24 Claims, 5 Drawing Sheets

SYSTEM AND METHOD FOR APPLET CACHING

CROSS-REFERENCE TO RELATED APPLICATIONS

This application claims priority from a previously-filed provisional patent application entitled "Applet Caching" filed on Dec. 28, 2001 bearing Ser. No. 60/346,373.

FIELD OF THE INVENTION

The present invention relates to an Applet initially retrieved by a client computer from a server computer over the Internet, which can then store itself or other Applets locally on a hard drive attached to the client computer and save some indication of the presence and location of the local copy of the Applet, obviating the need for the client computer to be connected to the Internet to make use of the Applet's functionality.

BACKGROUND

An Applet is a program made up of java byte code, often written in the Java Programming Language. Applets are primarily used in conjunction with HTML pages, possibly including or referencing scripts written in JavaScript, VBScript, or another scripting language, where they are controlled by a computer program, typically a web browser displaying the HTML page or executing the script or scripts. Applets may also be controlled by other programs, in a fashion determined by the program using the Applet. In either case, Applets are used to provide functionality not present in or not allowed by a standard web browser or other program, to provide functionality already available but at significantly increased performance, to provide additional security over that provided by the web browser or other program, or to perform any additional function normally associated with Applets.

Conventional use of an Applet is to construct an HTML page, possibly including or referencing an associated script or scripts, said page referencing an Applet or Applets residing on a hard drive attached or available to a server computer attached to the Internet. The HTML page is then placed on the same or another hard drive attached or available to the same or another server computer, also attached to the Internet. The server computer or computers are configured to provide access to the HTML page and Applet (and possibly other files) to a user using a web browser or other program designed to access content over the Internet.

When the user accesses the HTML page, the HTML page is copied from the server computer over the Internet to the user's computer, where it is interpreted by the web browser. As the HTML page has been constructed to reference the Applet, the web browser transfers the Applet from the server computer over the Internet to the user's computer where the browser, or an auxiliary program such as a Java Virtual Machine under control of the browser execute, the Applet. The functions performed by the Applet are determined by the program code making up the Applet and the HTML or JavaScript that caused the browser to access the Applet. This use of an Applet is shown in FIG. 1.

FIG. 1 illustrates a client computer 110 running a web browser or other computer program 111 capable of displaying HTML and making use of a Java Virtual Machine 112. The client computer 110 has access over the Internet 120 to a server computer 130 running a web server or other computer program 131 capable of servicing requests for documents residing on one or more hard drives 132 either connected directly to the server computer 130 or available over a local network. One of the hard drives 132 contains, possibly among other files, an HTML document 133 referencing an Applet 134 also contained on the same or another of the hard drives 132.

When a user using the client computer 110 instructs the web browser 111 to access the HTML document 133, the web browser 111 requests the HTML document 133 over the Internet 120 from the web server 131. The web server 131 retrieves the HTML document 133 from the hard drive 132 containing the document and transfers it over the Internet 120 to the web browser 111. The web browser 111 then interprets the HTML document 133. Because the HTML document 133 references the Applet 134, the web browser 111 requests the Applet 134 over the Internet 120 from the web server 131. The web server 131 retrieves the Applet 134 from the hard drive 132 containing the Applet and transfers it over the Internet 120 to the web browser 111. The web browser uses the Java Virtual Machine 112 to execute the Applet 134 as determined by the HTML document 133.

As the Applet 134 is requested from the web server 131 and transferred over the Internet 120 each time the user accesses the HTML document 133, the client computer 110 must be connected to the Internet 120 (which it also must be to access the HTML document 133) and the server computer 130 and Applet 134 must be available. Should any of these not be the case, the functionality provided by the Applet 134 will not be available to the user. Even if all these conditions are met, the Applet 134 must be transferred over the Internet 120, which may take a considerable amount of time depending upon the size of the Applet 134, the type of connections the client computer 110 and server computer 120 have to the Internet 120, network congestion, and other factors.

Another conventional use of an Applet is to construct an HTML page, possibly including or referencing an associated script or scripts, said page referencing an Applet or Applets residing on a hard drive attached or available to a server computer attached to the Internet. The HTML page is then transferred to one or more user's computers over the Internet, possibly contained in an e-mail message to the user. The user then uses his or her web browser to view the page now stored locally. As the HTML page has been constructed to reference the Applet, the web browser transfers the Applet from the server computer over the Internet to the user's computer where the browser, or an auxiliary program such as a Java Virtual Machine under control of the browser, execute the Applet. The functions performed by the Applet are determined by the program code making up the Applet and the HTML or JavaScript that caused the browser to access the Applet. This use of an Applet is shown in FIG. 2.

FIG. 2 illustrates a client computer 210 running a web browser or other computer program 211 capable of displaying HTML and making use of a Java Virtual Machine 212. The client computer 210 makes use of one or more hard drives 213 either connected directly to the client computer 210 or available over a local network. One of the hard drives 213 contains, possibly among other files, an HTML document 214 referencing an Applet 233.

The client computer 210 has access over the Internet 220 to a server computer 230 running a web server or other computer program 231 capable of servicing requests for documents residing on one or more hard drives 232 either connected directly to the server computer 230 or available over a local network. One of the hard drives 232 contains, possibly among other files, an Applet 233.

When a user using the client computer 210 instructs the web browser 211 to access the HTML document 214, the web browser 211 transfers the document from the hard drive 213 containing the HTML document 214 to the client computer 210. The web browser 211 then interprets the HTML document 214. Because the HTML document 214 references the Applet 233, the web browser 211 requests the Applet 233 over the Internet 220 from the web server 231. The web server 231 retrieves the Applet 234 from the hard drive 232 containing the Applet and transfers it over the Internet 220 to the web browser 211. The web browser uses the Java Virtual Machine 212 to execute the Applet 233 as determined by the HTML document 214.

As the Applet 233 is requested from the web server 231 and transferred over the Internet 220 each time the user accesses the HTML document 214, the client computer 210 must be connected to the Internet 220 (which it need not be to access the HTML document 214) and the server computer 230 and Applet 233 must be available. Should any of these not be the case, the functionality provided by the Applet 233 will not be available to the user. Even if all these conditions are met, the Applet 233 must be transferred over the Internet 220, which may take a considerable amount of time depending upon the size of the Applet 233, the type of connections the client computer 210 and server computer 220 have to the Internet 220, network congestion, and other factors.

The conventional uses of Applets suffer certain drawbacks. Among these drawbacks are the necessity of copying what may be a large file containing the Applet from a hard drive attached or available to a server computer over the Internet to a local computer; the necessity for the local computer to be connected to the Internet even if the browser or other program controlling the Applet and the HTML page or other document describing what functions the Applet should perform are local and need not be transferred over the Internet; and the possibility that access to the Applet may not be available even if the local computer is attached to the Internet, due to network congestion, the server computer or hard drive storing the Applet not being available, or other problem.

Another use of Applets exists similar to those described above, where the Applet has been cryptographically signed and is known as a Persistent Applet. Persistent Applets can be installed on a local computer, obviating the need to transfer the Applet over the Internet. However, this method also suffers certain drawbacks, among which are the difficulty in removing Persistent Applets once installed; the difficulty of updating the Persistent Applet to a newer version containing bug fixes, new functionality, enhanced security, or other modified characteristics; the difficulty in maintaining multiple incompatible versions of the Applet, for example to allow making use of legacy programs or documents requiring an older version while still allowing current programs or documents to use the most recent version; the difficulty in preparing Persistent Applets; and the requirement for a user to have Administrator privileges to install Persistent Applets on computers running certain operating systems, said privileges often not being available to users, particularly in corporate environments. For these and other reasons, Persistent Applets are rarely used in practice, despite the advantages they provide over regular Applets.

SUMMARY

It is an object of the present invention to provide a method for an Applet to be stored on a hard drive attached or available to a computer, such that the Applet is available to other programs running on the same computer wishing to make use of the Applet without transferring the Applet over the Internet.

It is a further object of the present invention to provide a method for an Applet to be stored on a hard drive attached or available to a computer, such that the Applet is available to other programs running on the same computer wishing to make use of the Applet whether or not the computer is attached to the Internet.

It is a further object of the present invention to provide a method for an Applet to be stored on a hard drive attached or available to a computer, such that the Applet is available to other programs running on the same computer wishing to make use of the Applet whether or not the server computer is accessible over the Internet.

It is a further object of the present invention to provide a method for an Applet to be stored on a hard drive attached or available to a computer, such that the user causing the storage of the Applet need not have any special privileges for the storage to occur.

It is a further object of the present invention to provide a method for an Applet to be stored on a hard drive attached or available to a computer, such that the Applet may be removed easily should the user desire to do so.

It is a further object of the present invention to provide a method for an Applet to be stored on a hard drive attached or available to a computer, such that the Applet may be easily updated to fix bugs, provide increased functionality, enhanced security, or other desirable characteristics.

It is a further object of the present invention to provide a method for an Applet to be stored on a hard drive attached to a computer, such that different, possibly mutually incompatible, versions of the Applet may be stored on the user's computer and each accessed as needed to use legacy programs or document or new programs or documents.

The above objects of the invention are achieved by having the Applet initially transferred to the user's computer over the Internet from a server computer as in one of the conventional methods for using an Applet described above. The Applet, being specially prepared by cryptographically signing the Applet, a procedure known to anyone versed in the art of constructing and deploying Applets, contains programming code to retrieve itself, either locally, or across the Internet from the server computer making the Applet available, and to install the Applet so retrieved on a hard drive attached or available to the local computer.

When the Applet has been initially transferred to the user's computer over the Internet from a server computer, the program controlling the Applet, in a preferred embodiment a web browser, possibly under the direction of a controlling document, in a preferred embodiment an HTML page possibly including or referencing a script or scripts, executes the programming code in the Applet to retrieve itself and to install the retrieved copy on a hard drive attached or available to the local computer.

The Applet may be made up of a plurality of subcomponents. These subcomponents may be stored in a single file, in a preferred embodiment a Java ARchive file, or as multiple files, each file containing one or more subcomponents of the Applet, in a preferred embodiment Java class files. Some subcomponents may be unnecessary when the Applet is stored locally and thus may or may not be stored locally. A preferred embodiment of the Applet selects which method to employ and which subcomponents to store based upon certain environmental factors related to the computer executing the Applet, such as the specific brand and version of web browser or other program controlling the Applet, the location of the document controlling the execution of the program controlling the Applet, and other factors.

In a preferred embodiment of the invention, the names of the Java ARchive file or the multiple files, the subcomponents, and the Applet itself may be different so that multiple versions of the same Applet or multiple Applets may be stored on the local hard drive simultaneously.

In a preferred embodiment of the invention, the Applet file or files are placed in an application specific or temporary directory. In an alternative preferred embodiment, the Applet file or files are stored in a known location, such as a directory named "lib" in a directory named "java" in the system directory containing such directories, or in other such directories, in such a fashion that the files are automatically available to the Java Virtual Machine on the computer.

Some indication may then be made that the Applet has been stored locally. In a preferred embodiment, either the script controlling the program controlling the Applet or the Applet itself sets a "cookie", a small piece of named data used by web browsers and other programs to store information across sessions. In a preferred embodiment, the name of the cookie is formed from the name of the Applet, including possible version information, in such a manner that a plurality of Applet cookies may be available simultaneously. In a preferred embodiment of the invention, the value stored in the cookie indicates the location of the applet on the local computer, either directly using a file system path to the file or files containing the Applet, or indirectly using a token representing a known location on the hard drive attached or available to the local computer.

The above objects of the invention are then further achieved in subsequent uses of the document or program controlling the Applet by making use of the stored cookie to indicate to the controlling program, in a preferred embodiment a web browser, that the Applet should be retrieved from the file or files stored on the hard drive attached or available to the local computer, as opposed to a hard drive attached or available to a server computer over the Internet. After so retrieved, the Applet can then execute in the same manner as if the Applet had been retrieved over the Internet, providing the additional functionality, speed, or security for which the Applet was designed.

BRIEF DESCRIPTION OF THE DRAWINGS

The structural and functional aspects of the invention will become understood by those skilled. in the art by reference to the following detailed description when taken in conjunction with the appended drawings, in which.

DETAILED DESCRIPTION

Figure 1:
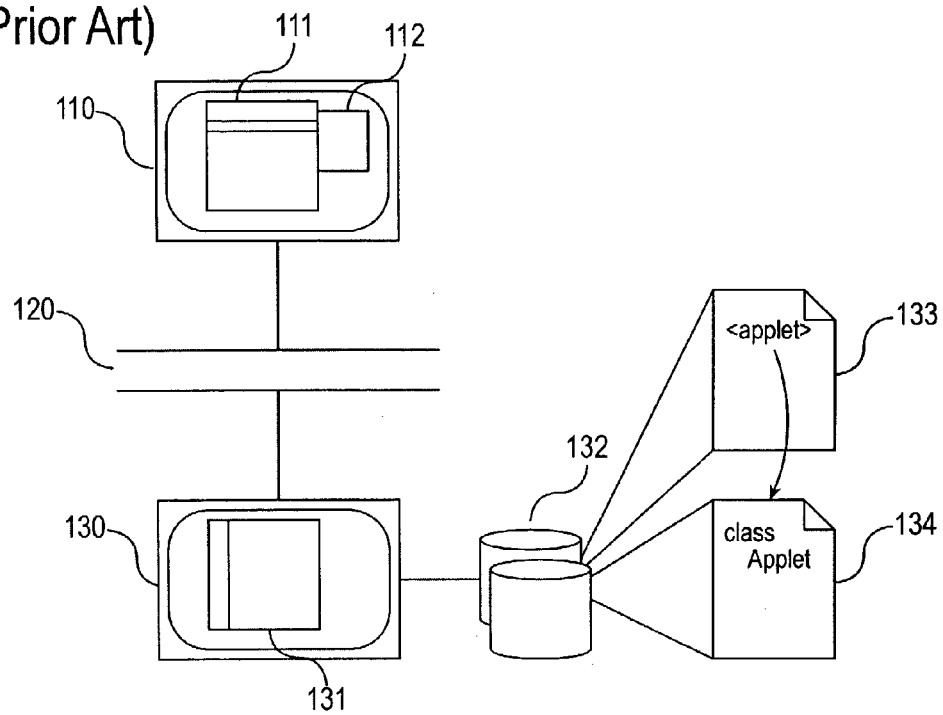
FIG. 1 illustrates the first of the conventional uses of Applets described above.
Figure 2:
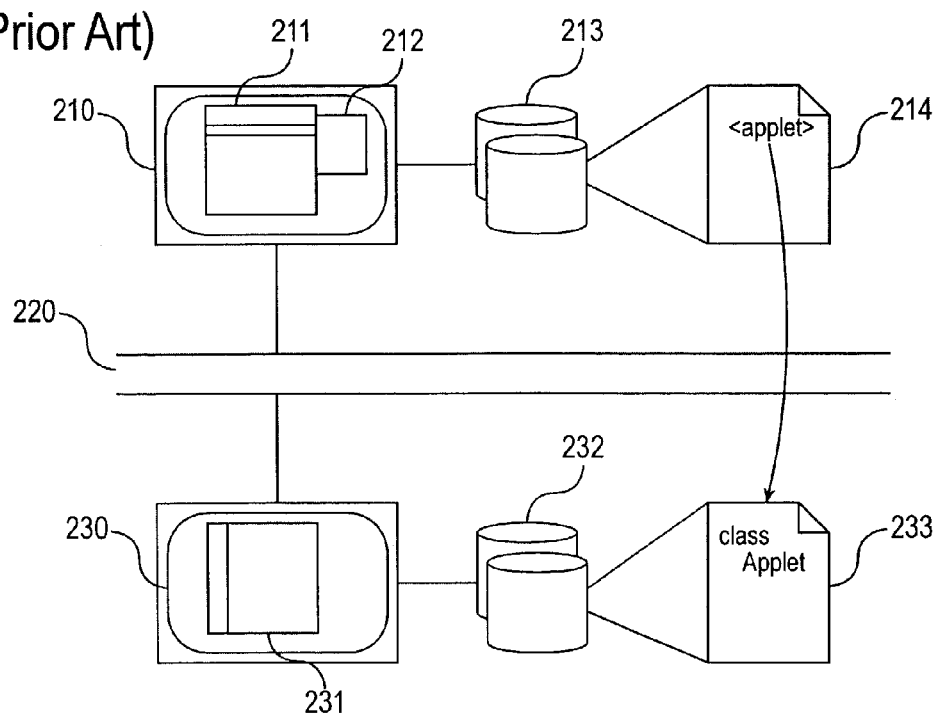
FIG. 2 illustrates the second of the conventional uses of Applets described above.

The above objects of the invention are achieved by having the Applet initially transferred to the user's computer over the Internet from a server computer as in one of the conventional methods for using an Applet described above. The Applet, being specially prepared by cryptographically signing the Applet, a procedure known to anyone versed in the art of constructing and deploying Applets, contains programming code to retrieve itself, either locally, or across the Internet from the server computer making the Applet available, and to install the Applet so retrieved on a hard drive attached or available to the local computer.

When the Applet has been initially transferred to the user's computer over the Internet from a server computer, the program controlling the Applet, in a preferred embodiment a web browser, possibly under the direction of a controlling document, in a preferred embodiment an HTML page possibly including or referencing a script or scripts, executes the programming code in the Applet to retrieve itself and to install the retrieved copy on a hard drive attached or available to the local computer.

The Applet may be made up of a plurality of subcomponents. These subcomponents may be stored in a single file, in a preferred embodiment a Java ARchive file, or as multiple files, each file containing one or more subcomponents of the Applet, in a preferred embodiment Java class files. Some subcomponents may be unnecessary when the Applet is stored locally and thus may or may not be stored locally. A preferred embodiment of the Applet selects which method to employ and which subcomponents to store based upon certain environmental factors related to the computer executing the Applet, such as the specific brand and version of web browser or other program controlling the Applet, the location of the document controlling,the execution of the program controlling the Applet, and other factors.

In a preferred embodiment of the invention, the names of the Java ARchive file or the multiple files, the subcomponents, and the Applet itself may be different so that multiple versions of the same Applet or multiple Applets may be stored on the local hard drive simultaneously.

In a preferred embodiment of the invention, the Applet file or files are placed in an application specific or temporary directory. In an alternative preferred embodiment, the Applet file or files are stored in a known location, such as a directory named "lib" in a directory named "java" in the system directory containing such directories, or in other such directories, in such a fashion that the files are automatically available to the Java Virtual Machine on the computer.

Some indication may then be made that the Applet has been stored locally. In a preferred embodiment, either the script controlling the program controlling the Applet or the Applet itself sets a "cookie", a small piece of named data used by web browsers and other programs to store information across sessions. In a preferred embodiment, the name of the cookie is formed from the name of the Applet, including possible version information, in such a manner that a plurality of Applet cookies may be available simultaneously. In a preferred embodiment of the invention, the value stored in the cookie indicates the location of the applet on the local computer, either directly using a file system path to the file or files containing the Applet, or indirectly using a token representing a known location on the hard drive attached or available to the local computer.

The above objects of the invention are then further achieved in subsequent uses of the document or program controlling the Applet by making use of the stored cookie to indicate to the controlling program, in a preferred embodiment a web browser, that the Applet should be retrieved from the file or files stored on the hard drive attached or available to the local computer, as opposed to a hard drive attached or available to a server computer over the Internet. After so retrieved, the Applet can then execute in the same manner as if the Applet had been retrieved over the Internet, providing the additional functionality, speed, or security for which the Applet was designed.

Figure 3:
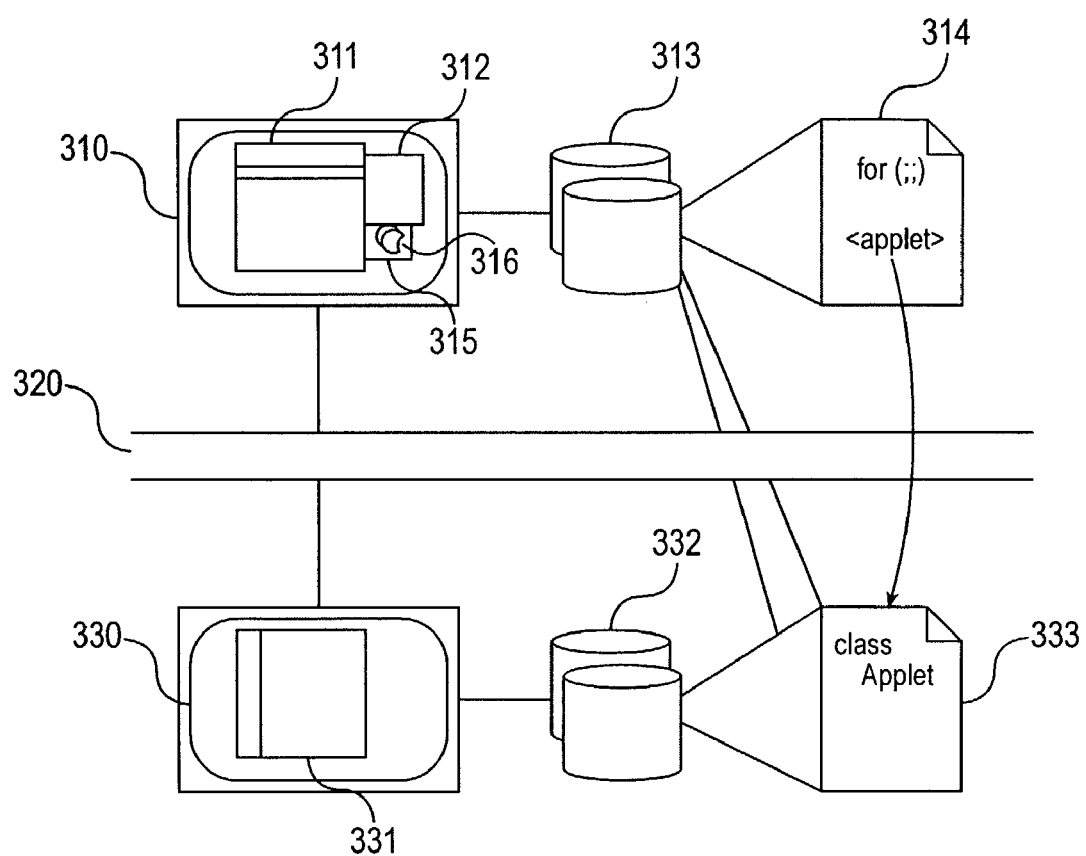
FIG. 3 illustrates a user's first use of the invention.

FIG. 3 illustrates a client computer 310 running a web browser or other computer program 311 capable of displaying HTML and interpreting a scripting language such as JavaScript, VBScript, or another scripting language, making use of a Java Virtual Machine 312, and having a cookie store 315. The client computer 310 makes use of one or more hard drives 313 either connected directly to the client computer 310 or available over a local network. One of the hard drives 313 contains, possibly among other files, an HTML document 314 containing or referencing a script or scripts written in JavaScript, VBScript, or another scripting language, and referencing an Applet 333. The cookie store 315 contains zero or more cookies 316, none of which identify an Applet matching Applet 333.

The client computer 310 has access over the Internet 320 to a server computer 330 running a web server or other computer program 331 capable of servicing requests for documents residing on one or more hard drives 332 either connected directly to the server computer 330 or available over a local network. One of the hard drives 332 contains, possibly among other files, an Applet 333.

When a user using the client computer 310 instructs the web browser 311 to access the HTML document 314, the web browser 311 transfers the document from the hard drive 313 containing the document to the client computer 310. The web browser 311 then interprets the HTML document 314 and automatically, or based upon user input, executes one or more scripts contained in or referenced by the HTML document 314. The script or scripts examine the cookie store 315 to determine whether a cookie exists indicating the presence and location of an Applet on one of the hard drives 313 (either the same hard drive 313 containing the HTML document 314 or another) matching Applet 333. In this instance, neither the Applet nor the cookie are present.

Because the HTML document 314 references the Applet 333, the web browser 311 requests the Applet 333 over the Internet 320 from the web server 331. The web server 331 retrieves the Applet 334 from the hard drive 332 containing the Applet and transfers it over the Internet 320 to the web browser 311. The web browser uses the Java Virtual Machine 312 to execute the Applet 333 as determined by the HTML document 314. As part of the execution of the Applet 333, one of the script or scripts in the HTML document 314 instructs the Applet 333 to retrieve and install itself on one of the hard drives 313, and then adds a cookie to the cookie store 315 indicating the location of the installed Applet 333.

Figure 4:
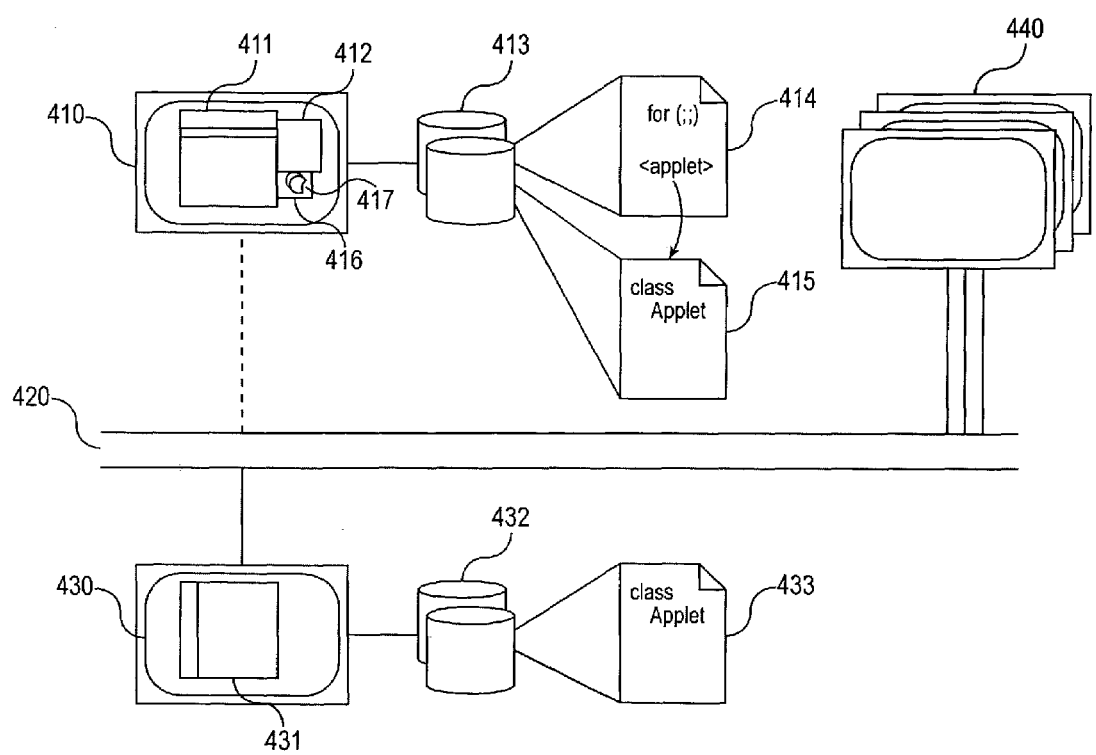
FIG. 4 illustrates a user's second and subsequent uses of the invention.

FIG. 4 illustrates a client computer 410 running a web browser or other computer program 411 capable of displaying HTML and interpreting a scripting language such as JavaScript, VBScript, or another scripting language, making use of a Java Virtual Machine 412, and having a cookie store 416. The client computer 410 makes use of one or more hard drives 413 either connected directly to the client computer 410 or available over a local network. One of the hard drives 413 contains, possibly among other files, an HTML document 414 containing or referencing a script or scripts written in JavaScript, VBScript, or another scripting language, and referencing an Applet 415. The cookie store 416 contains one or more cookies 417, one of which identifies the location, either directly using a file path or indirectly using a token to indicate a known location, of Applet 415.

When a user using the client computer 410 instructs the web browser 411 to access the HTML document 414, the web browser 411 transfers the document from the hard drive 413 containing the document to the client computer 410. The web browser 411 then interprets the HTML document 414 and automatically, or based upon user input or other environmental factor, executes one or more scripts contained in or referenced by the HTML document 414. The script or scripts examine the cookie store 416 to determine whether a cookie exists indicating the presence and location of the Applet 415 on one of the hard drives 413 (either the same hard drive 413 containing the HTML document 414 or another).

In this instance, such a cookie exists, so the script or scripts extract the cookie's value and use it to indicate to the web browser 411 that the Applet 415 should be retrieved from the hard drive 413 indicated by the cookie's value. The web browser 411 retrieves the Applet 415 from the hard drive 413 containing the Applet and uses the Java Virtual Machine 412 to execute the Applet 415 as determined by the HTML document 414.

A server computer 430 running a web server or other computer program 431 capable of servicing requests for documents residing on one or more hard drives 432 either connected directly to the server computer 430 or available over a local network is connected to the Internet 420. One of the hard drives 432 contains, possibly among other files, an Applet 433. The client computer 410 need not be (although it may be) connected to the Internet. In either case, the Applet 433 need not be transferred over the Internet 420 as the client computer 410 has access to a local copy 415. However, other computers 440 may not yet have local copies, so they can still request the Applet 433 as described by FIG. 3.

Figure 5:
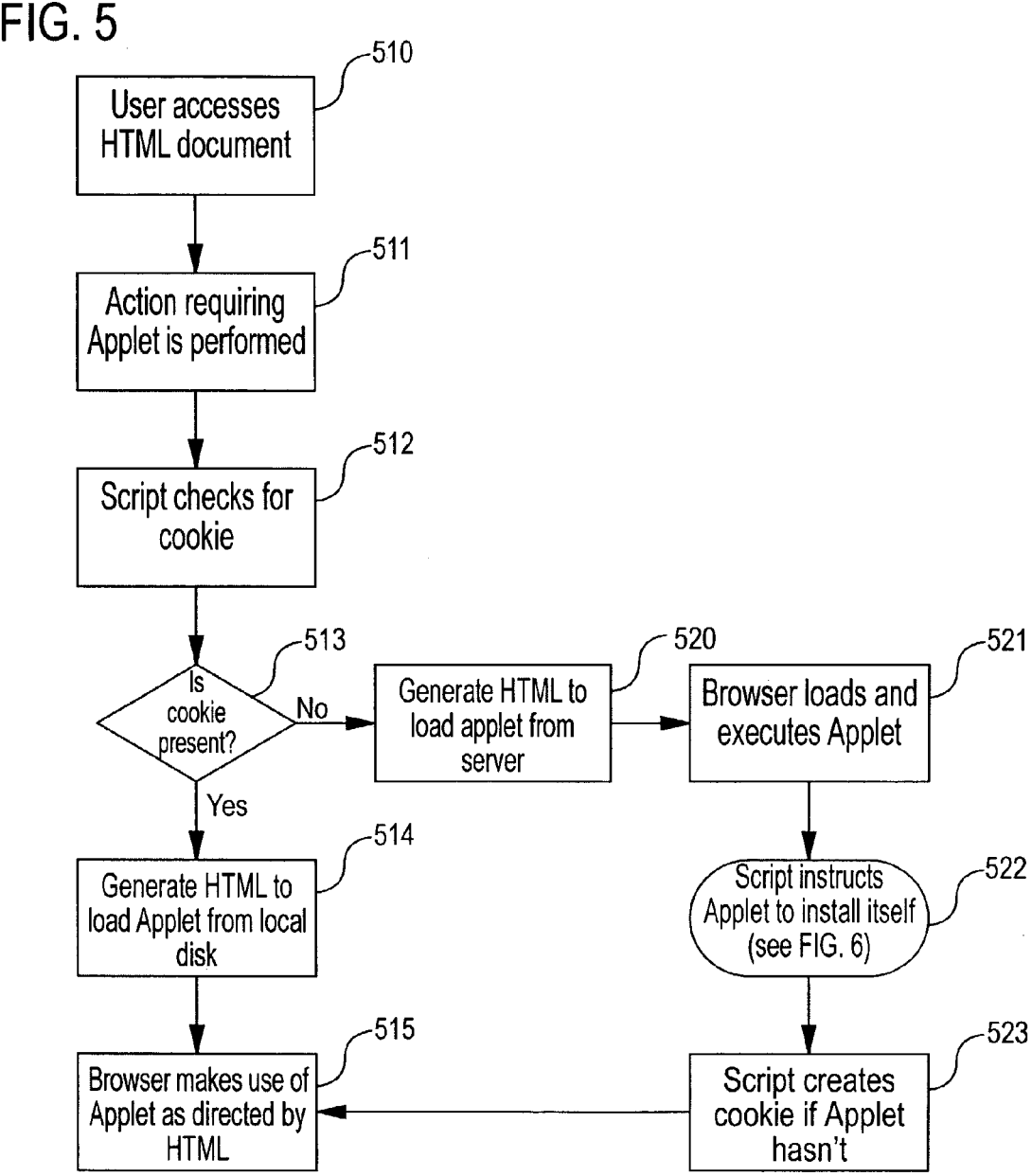
FIG. 5 illustrates the process of opening an HTML document using the invention.

FIG. 5 illustrates the process of opening an HTML document referencing an Applet implementing the invention. In function block 510, the user accesses the HTML document referencing the Applet. In function block 511, some action is performed which requires the Applet. This action may be performed automatically when the HTML document is initially accessed, automatically at some later point in time, or manually due to some action the user takes. The action causes a script written in JavaScript, VBScript, or some other scripting language embedded in or referenced by the HTML document to execute, starting with function block 512. The script checks for the existence of a cookie, the implementation of which is well-known to anyone versed in the art of client-side scripting, corresponding to the Applet required by the HTML document.

Decision block 513 tests whether or not the cookie was found. If the cookie was not found, processing continues with function block 520. Function block 520 consists of the script generating appropriate HTML, the process of which is well-known to anyone versed in the art of HTML and scripting language interaction, to load the Applet from a server. The server is normally located on the Internet. In function block 521, the web browser interprets the HTML generated in function block 520 and retrieves the Applet from the server. When the Applet has been retrieved, in function block 522 the script instructs the Applet to install itself (see FIG. 6). When the Applet has installed a copy of itself locally, it either sets the cookie containing its location, or returns the location, depending upon environmental factors, such as the browser brand and version in use. If the Applet has not set the cookie, the script does so in function block 523. The Applet has now been stored locally and execution continues with function block 515.

In decision block 513, if there is a cookie present indicating the location of the Applet locally, either directly using a file path or indirectly using a token to indicate a known location, execution continues with function block 514. In function block 514, the script generates appropriate HTML, the process of which is well-known to anyone versed in the art of HTML and scripting language interaction, to load the Applet from the location indicated by the cookie's value. When the Applet has been loaded, the browser is free to make use of the Applet's capabilities in function block 515.

Figure 6:
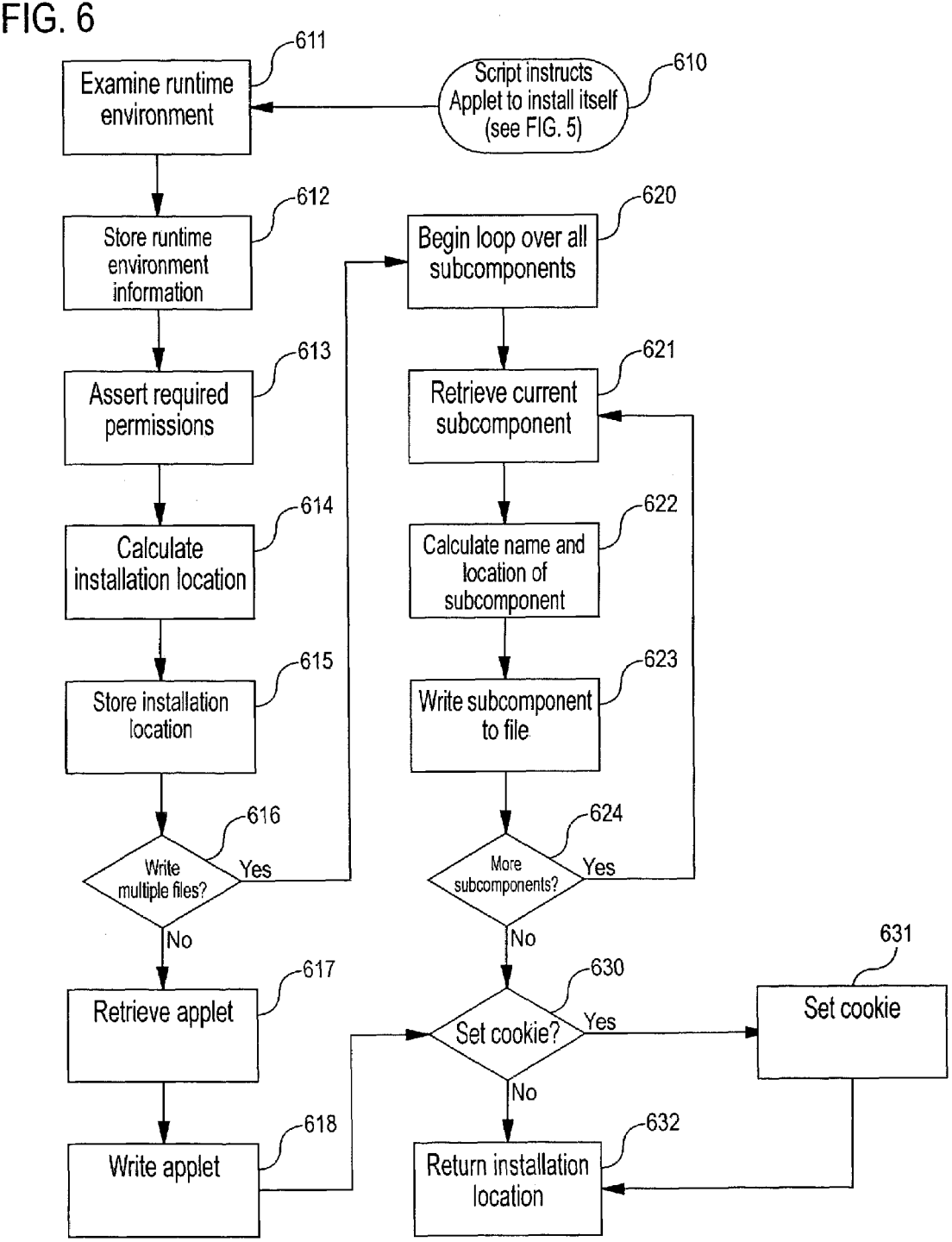
FIG. 6 illustrates the process of the invention caching an Applet on a local hard drive.

FIG. 6 illustrates the process of the invention caching an Applet on a local hard drive. The process is initiated in function block 610, which corresponds to function block 522 of FIG. 5, when the script contained in or referenced by the HTML document instructs the applet, loaded by the web browser in function block 521 of FIG. 5, to install itself. Installation begins with function block 611 when the Applet examines its runtime environment, determining such things as the browser brand and version the Applet is running under, various Java system properties, and any other values needed for installation. The Applet then stores the values determined in function block 611 in function block 612 for future use.

Because the Applet is going to write files to a hard drive attached to or accessible from the local computer, it needs to be granted special permission. In function block 613, the Applet asserts the required permissions. Execution then continues with function block 614, where the installation location is calculated. The installation location depends upon the runtime environment factors determined in function block 611 and stored in function block 612. When the installation location has been calculated in function block 614, it is stored in for later use in function block 615.

When the location has been calculated and stored, decision block 616 determines whether the Applet will be stored locally as a single file or as multiple files. This determination is based upon the runtime environment factors determined in function block 611 and stored in function block 612. If the Applet is going to be stored locally in a single file, execution continues with function block 617, otherwise it continues with function block 620.

In function block 617, the Applet is retrieved, either locally or from the server computer the Applet was originally retrieved from. In function block 618, the Applet data retrieved in function block 617 is written to a file in the location calculated in function block 614 and stored in function block 615. Execution then continues with decision block 630.

If it is determined in decision block 616 that the Applet is going to be stored locally in multiple files, execution continues to function block 620, where the Applet begins a loop encompassing each of the subcomponents of the Applet. The first action in the loop occurs in function block 621, where the current subcomponent is retrieved, either locally or from the server computer the Applet was originally retrieved from. When the current subcomponent has been retrieved in function block 621, the name and location of the file to be written containing the subcomponent are calculated, using the installation location calculated in function block 614 and stored in function block 615. The subcomponent is then written to the file in function block 623. Then in function block 624, it is determined whether there are more subcomponents remaining to process. If there are, execution returns to function block 621,. otherwise it proceeds to decision block 630.

Decision block 630 tests whether the cookie containing the location of the Applet calculate in function block 614 and stored in function block 615 should, be set here or deferred to function block 523 in FIG. 5. This decision is based upon one or more of the runtime environment factors determined in function block 611 and stored in function block 612. If the cookie is to be set by the Applet, function block 631 does so. If the cookie is not to be set, or the cookie has been set, execution continues with function block 632, where the installation location calculated in function block 614 and stored in function block 615 is returned. Execution then continues with function block 523 in FIG. 5.

The various embodiments described above have been presented for purposes of explanation only, and the present invention should not be construed to be so limited. Variations on the present invention will become readily apparent to those skilled in the art after reading this description, and the present invention and appended claims are intended to encompass such variations as well.

The invention claimed is:

1. A method comprising:
    in response to a browser application on a client computer initiating a first execution of one or more scripts contained in a document that references an applet,
        the client computer checking for the existence of a browser cookie in a cookie store of the browser application;
        the client computer causing the browser application to receive the applet from a server over a data network,
        the client computer instructing the applet to install itself on a locally available device of the client computer,
        wherein instructing the applet to install itself causes the applet to store itself on a locally available device of the client computer, and
        the client computer adding a browser cookie to the cookie store of the browser application, said browser cookie indicating the location and existence of said applet on a locally available device of the client computer;
    the client computer storing the document on a locally available device of the client computer to produce a locally stored copy of the document;
    in response to the browser application on the client computer initiating a second execution of the one or more scripts from the locally stored copy of the document,
        determining, without use of a data network, based on the browser cookie added to the cookie store, that the applet is stored on a locally available device of the client computer, and
        the client computer causing execution of the applet from a locally available device of the client computer.

2. A method according to claim 1 further comprising:
    utilizing, by using said browser cookie, said applet from a locally available device of the client computer in any actions requiring said applet.

3. A method according to claim 1 wherein said instructing said applet to install itself and said adding said browser cookie to the cookie store of the browser application is performed only once.

4. A method according to claim 1, further comprising:
    in response to instructing said applet to install itself, said applet performing the steps of:
        examining runtime environment information;
        asserting permissions required for storing said applet on a locally available device of the client computer; and
        storing said applet on a locally available device of the client computer.

5. A method according to claim 4 wherein if said applet is composed of a plurality of sub-components, then storing said applet on a locally available device of the client computer further comprises:
    processing each sub-component of said plurality of sub-components such that all sub-components of said plurality of sub-components are accessible on a locally available device of the client computer.

6. A method according to claim 5 wherein processing includes:
  retrieving each sub-component of said plurality of sub-components;
  determining a sub-component location and name for each sub-component of said plurality of sub-components; and
  storing each sub-component of said plurality of sub-components to its own file at said sub-component location with said sub-component name.

7. A method according to claim 1 further comprising storing multiple versions of the same applet.

8. The method of claim 1 wherein the step of causing the browser application to receive the applet from a server includes generating instructions, executable by the browser application, to retrieve the applet from the server over the data network; and wherein the step of generating instructions is performed in response to determining that a browser cookie indicating the location and existence of the applet on a locally available device of the client computer does not exist in the cookie store.

9. The method of claim 1 wherein the step of causing execution of the applet includes generating instructions, executable by the browser application, to load said applet from a location on a locally available device of the client computer indicated by the browser cookie; and wherein the step of generating instructions is performed in response to determining that the browser cookie indicating the location and existence of said applet on a locally available device of the client computer exists in the cookie store.

10. The method of claim 1 wherein the step of adding a browser cookie to the cookie store of the browser application is performed by the applet.

11. The method of claim 8, wherein the generated instructions is Hypertext Markup Language (HTML) code executable by the browser application.

12. The method of claim 9, wherein the generated instructions is Hypertext Markup Language (HTML) code executable by the browser application.

13. A client computer comprising:
  a script recorded on a hard drive of the client computer, wherein the script is configured to load and execute in a browser application, wherein the script is contained in a document that references an applet, wherein the script, when executed by the client computer, is operable to perform:
  in response to the browser application initiating a first execution of the script,
    checking for the existence of a browser cookie in a cookie store of the browser application;
    causing the browser application to receive the applet from a server over a data network,
    instructing the applet to install itself on a locally available device of the client computer,
    wherein instructing the applet to install itself causes the applet to store itself on a locally available device of the client computer, and
    adding a browser cookie to the cookie store of the browser application, said browser cookie indicating the location and existence of said applet on a locally available device of the client computer;
  in response to the browser application initiating a second execution of the script,
    determining, without use of a data network, based on the browser cookie added to the cookie store, that the applet is stored on a locally available device of the client computer, and
    causing execution of the applet from a locally available device of the client computer.

14. The computer of claim 13, wherein the script is further operable when executed to perform:
  utilizing, by using said browser cookie, said applet from a locally available device of the client computer in any actions requiring said applet.

15. The computer of claim 13 wherein the script is further operable when executed to perform said instructing said applet to install itself and said adding said browser cookie to the cookie store of the browser application only once.

16. The client computer of claim 13
  wherein the script causes the browser application to receive the applet from a server by generating instructions, executable by the browser application, to retrieve the applet from the server over the data network; and
  wherein the script generates the instructions in response to determining that a browser cookie indicating the location and existence of the applet on a locally available device of the client computer does not exist in the cookie store.

17. The client computer of claim 13
  wherein the script causes execution of the applet by generating instructions, executable by the browser application, to load said applet from a location on a locally available device of the client computer indicated by the browser cookie; and
  wherein the script generates the instructions in response to determining that the browser cookie indicating the location and existence of said applet on a locally available device of the client computer exists in the cookie store.

18. The client computer of claim 13 wherein the script adding a browser cookie to the cookie store of the browser application comprises causing the applet to add the browser cookie to the cookie store.

19. A client computer comprising:
  means for checking for the existence of a browser cookie in a cookie store of the browser application;
  means for causing the browser application to receive an applet from a server over a data network;
  means for instructing the applet to install itself on a locally available device of a client computer;
  wherein the applet, when instructed to install itself on a locally available device of a client computer, is operable to store itself on a locally available device of the client computer;
  means for adding a browser cookie to the cookie store of the browser application, said browser cookie indicating the location and existence of said applet on a locally available device;
  wherein the means for checking, the means for causing the browser application to receive, the means for instructing, and the means for adding are operable in response to the browser application initiating a first execution of one or more scripts contained in a document that references the applet;
  means for storing the document on a locally available device of the client computer to produce a locally stored copy of the document;
  means for determining, without use of a data network, and based on the browser cookie added to the cookie store, that the applet is stored on a locally available device of the client computer; and
  means for causing execution of the applet from a locally available device of the client computer;

wherein the means for determining and the means for causing execution comprises the one or more scripts contained in the locally stored copy of the document;

wherein the means for determining and the means for causing execution are operable in response to the browser application initiating a second execution of the one or more scripts from the locally stored copy of the document.

20. The computer of claim 19, further comprising means for utilizing, by using said browser cookie, said applet from a locally available device of the client computer in any actions requiring said applet.

21. The computer of claim 19 wherein said means for instructing said applet to install itself and said means for adding said browser cookie to the cookie store of the browser application operate only once.

22. The client computer of claim 19 wherein the means for causing the browser application to receive the applet from a server includes means for generating instructions, executable by the browser application, to retrieve the applet from the server over the data network; and wherein the means for generating instructions is operable in response to determining that a browser cookie indicating the location and existence of the applet on a locally available device of the client computer does not exist in the cookie store.

23. The client computer of claim 19 wherein the means for causing execution of the applet includes means for generating instructions, executable by the browser application, to load said applet from a location on a locally available device of the client computer indicated by the browser cookie; and wherein the means for generating instructions is operable in response to determining that the browser cookie indicating the location and existence of said applet on a locally available device of the client computer exists in the cookie store.

24. The client computer of claim 19 wherein the means for adding a browser cookie to the cookie store of the browser application is operable in the applet.

* * * * *